United States Patent [19]

Eberhardt

[11] 4,306,479
[45] Dec. 22, 1981

[54] PORTABLE POWER DRIVEN CUTTING TOOL GUIDE

[76] Inventor: James F. Eberhardt, 6791 Versailles Rd., Lakeview, N.Y. 14085

[21] Appl. No.: 135,439

[22] Filed: Mar. 31, 1980

[51] Int. Cl.³ .............................................. B27B 9/04
[52] U.S. Cl. ........................................ 83/745; 33/479
[58] Field of Search ............... 83/745; 33/479 X, 480, 33/468, 32 B, 32 C; 269/1, 2

[56] References Cited

U.S. PATENT DOCUMENTS

| | | | |
|---|---|---|---|
| 1,149,277 | 8/1915 | Moffatt | 33/479 |
| 2,078,601 | 4/1937 | Cutting | 33/468 |
| 3,381,382 | 5/1968 | Kemp | 33/480 |
| 3,913,440 | 10/1975 | Baker | 83/745 |
| 3,979,987 | 9/1976 | Mayhew et al. | 83/745 |
| 4,028,976 | 6/1977 | Kundikoff | 83/745 |
| 4,054,077 | 10/1977 | Gram | 83/745 |
| 4,056,028 | 11/1977 | Patterson | 83/745 |
| 4,128,030 | 12/1978 | Kundikoff | 83/745 |
| 4,244,118 | 1/1981 | Matuszak | 83/745 X |

*Primary Examiner*—Frank T. Yost
*Attorney, Agent, or Firm*—Christel, Bean & Linihan

[57] ABSTRACT

A guide for portable power driven cutting tools comprising a guide member having a surface for placement on a workpiece and a tool guiding edge, and a gauge bar carried by the guide member for positioning the guide member on the workpiece in spaced relation to the line of cut. The guide is provided with at least one finger engageable formation on the guide member for maintaining the guide in a fixed position relative to a workpiece while a cut is being made by the power tool.

5 Claims, 3 Drawing Figures

U.S. Patent     Dec. 22, 1981     4,306,479
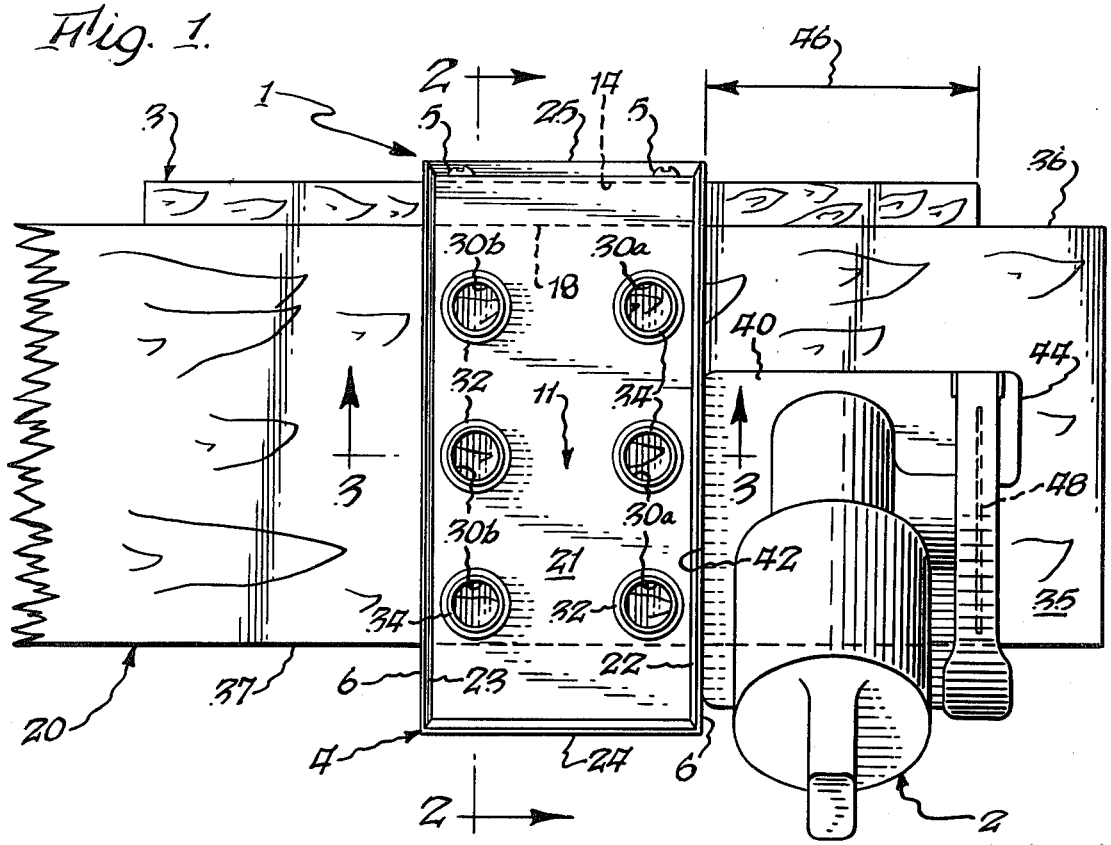
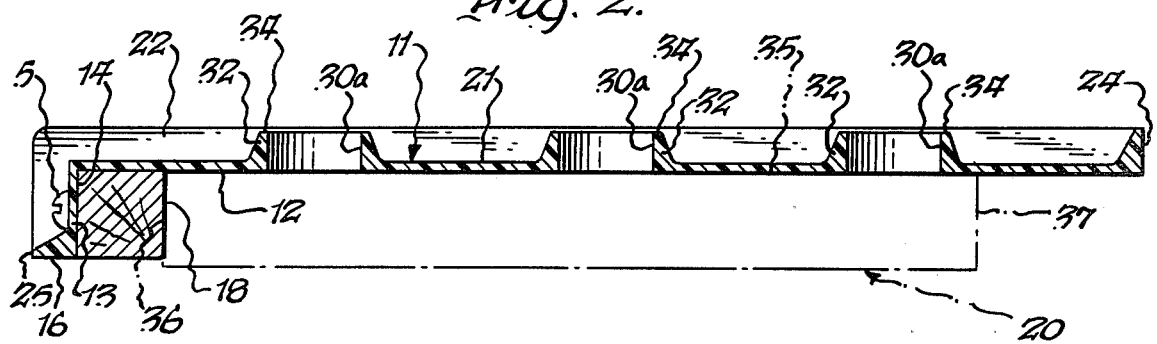
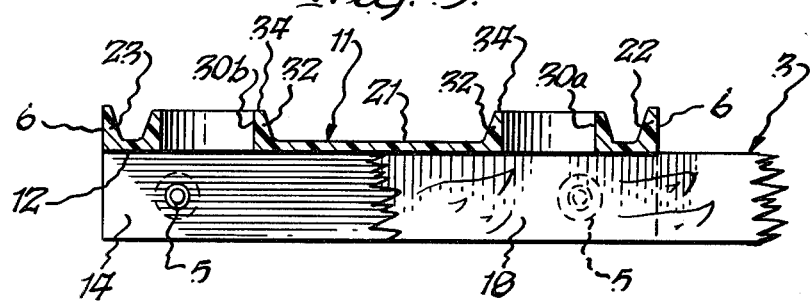

PORTABLE POWER DRIVEN CUTTING TOOL GUIDE

BACKGROUND OF THE INVENTION

This invention relates to portable power driven cutting tool guides, and more particularly to a new and improved guide which can be manually maintained in a desired position in a manner preventing slipping of the guide or of the operator's hand during cutting.

One problem typically encountered with available portable cutting tool guides is the difficulty of safely and securely maintaining them in a fixed position relative to a workpiece while a cut is being made without the use of mechanical clamping devices. Such devices often are not suitable because they are cumbersome and require an excessive amount of time to set up thereby reducing the operator's efficiency.

While the prior art discloses guides that are manually maintained in a desired position, they do not provide for effective prevention of slipping of the guide or of the operator's hand during cutting without requiring an operator to extend his free arm across the entire width of the workpiece to grasp an edge of the guide.

Another disadvantage of prior art portable cutting tool guides is that they can be utilized by only a right handed individual or by a left handed individual but not by both.

SUMMARY OF THE INVENTION

Accordingly, it is a principal object of the present invention to provide a new and improved guide for a portable power driven cutting tool.

It is a further object of the present invention to provide such a guide which may be manually maintained in a fixed relationship relative to a workpiece in a safe and effective manner.

It is a further object of the present invention to provide such a guide which may be used by either a right-handed or left-handed person.

It is a further object of this invention to provide such a guide for use in cutting workpieces of various widths.

It is a further object of the present invention to provide such a guide which does not slip out of position while it is manually held relative to a workpiece while a cut is being made.

It is a further object of this invention to provide such a guide which is simple in construction, economical to manufacture and convenient, safe and effective to use.

The present invention provides a guide for a portable power driven cutting tool comprising a guide member having a surface for placement on a workpiece and a tool guiding edge, a gauge bar carried by the guide member for positioning the guide member on the workpiece in spaced relation to the line of cut, and at least one finger engageable formation which is utilized to maintain the guide in a fixed position relative to a workpiece while preventing the operator's finger from slipping out of or past the formation. In preferred form each formation comprises a recess in a surface of the guide member adapted to accommodate the placement of a finger therein. Preferably a plurality of formations are provided, and the formations are selectively positioned on the guide to permit either a right or a left handed operator to use the guide without adjustment, regardless of the width of the workpiece.

The foregoing and other objects, advantages and characterizing features of the present invention will become clearly apparent upon a reading of the ensuing detailed description together with the accompanying drawing wherein like references denote like parts throughout the various views.

BRIEF DESCRIPTION OF THE DRAWING FIGURES

FIG. 1 is a top plan view of a guide according to the present invention in a position of use on a workpiece guiding a portable power driven cutting tool;

FIG. 2 is a vertical sectional view taken along the line 2—2 of FIG. 1; and

FIG. 3 is a vertical sectional view taken along the line 3—3 of FIG. 1.

DETAILED DESCRIPTION OF AN ILLUSTRATIVE EMBODIMENT

Referring now in detail to the embodiment illustrated in the accompanying drawing, a guide of this invention, generally designated 1, is shown in FIG. 1 in operative position for guiding a portable, hand held, power driven cutting tool 2 shown as a circular saw. However, it will be appreciated that the guide of this invention can be used with any number of reciprocating or circular motion cutting tools of the type adapted to seat on the workpiece and be guided thereacross.

As shown in FIGS. 1 and 2, guide 1 comprises a gauge bar 3 and a guide member 4. Gauge bar 3 is an elongated bar, shown in FIGS. 1 and 2 as being relatively square in cross-section, and is removably attached to the guide member 4 by means of any suitable fastening means such as screws 5 or by appropriate clamping means. It should be appreciated that gauge bar 3 could be fixedly attached to guide member 4, for example by means of any conventional adhesive. Also, while gauge bar 3 is illustrated as being disposed perpendicular to the parallel side edges 6 of guide member 4, bar 3 and member 4 could be arranged so that gauge bar 3 would extend outwardly beyond tool guiding edges 6 at any selected angle relative thereto.

Guide member 4 is molded of a rigid, durable material, for example a fiberglass reinforced resinous plastic material. Gauge bar 3 is composed of rigid, inelastic material capable of being cut through by a cutting tool, for example wood. However, other suitable materials can be used for members 3 and 4 within the purview of this invention.

Guide member 4 is generally rectangular in shape, as shown in FIG. 1, and comprises a main body portion 11 having a flat, inner surface 12 adapted to seat on the workpiece and be slid thereacross for positioning thereon and a lip portion 13 having a flat inside surface 14. In a typical position of use illustrated in FIG. 1, body portion 11 is disposed substantially horizontally and lip portion 13 substantially vertically. As shown in FIG. 2, lip portion 13 extends along the entire end edge of guide 4, substantially perpendicular to side edges 6. Lip 13 also extends from main body portion 11 in a direction such that surfaces 12 and 14 define substantially a right angle therebetween. Lip 13 terminates in an outwardly extending planar end surface 16 disposed substantially parallel to surface 12 of body portion 11. The distance between surfaces 12,16 is substantially equal to the thickness of gauge bar 3 so that lip surface 16 is substantially flush with the adjacent exposed surface of gauge bar 3. In addition, gauge bar 3 is affixed to guide member 4 so that two adjacent sides of gauge bar 3 are flush with the inner surface 12 of body portion 11 and the inside surface 14 of lip portion 13, respectively. Gauge bar 3 has an inner surface 18 disposed at substantially a right angle to body surface 12 so as to be exposed for contact with an edge of the workpiece. The workpiece in the present illustration is in the form of a wooden plank 20. In addition, the length of gauge bar 3 is greater than the length of the edge of guide member 4 containing lip 13 so that the ends of bar 3 are located outwardly beyond guide edges 6. In the device shown, for example, guide bar 3 has a length about three times the length of lip 13.

As shown in FIGS. 1-3, the periphery of guide member 4 is defined by a wall which projects outwardly in a plane substantially normal to the plane of an outer surface 21 of the guide member body portion 11. The surfaces 12 and 21 of body portion 11 face in opposite directions and are disposed in substantially parallel planes. In the device shown, the peripheral wall includes side wall portions 22,23 which are joined by end wall portions 24,25 to provide a continuous, elongated peripheral wall. The wall outer surfaces are disposed substantially perpendicular to the plane of the adjacent portion of guide member 4, and the wall inner surfaces are angularly disposed to define a taper for added strength. The outer surfaces of the side wall portions 22,23 are the afore-mentioned tool guiding edges 6. The end walls 24,25 contribute to the strength of the structure but could be omitted if desired. Lip portion 13 includes end wall 25 and adjacent portions of side walls 22,23 merely for convenience in manufacture. In particular, guide member 4 most conveniently would be molded or otherwise formed as a planar sheet of plastic or the like with side wall portions 22,23 joined by end wall portions 24,25 whereupon one end would be bent to provide lip portion 13.

In accordance with the present invention, guide member 4 is provided with at least one finger engageable formation thereon to facilitate manually maintaining guide member 4 in a fixed position relative to a workpiece 20 during operation of a cutting tool 2. In the present illustration, each finger engageable formation comprises an opening 30 extending through body portion 11, and in the device shown a plurality of openings 30 are located within the perimeter of body portion 11. In addition, the openings 30 in the device shown are arranged in a selected pattern so as to be engageable by fingers of either a left or a right hand and so that the guide can be utilized in conjunction with workpieces of various widths. Also, it should be noted that the finger engageable formations can have other forms and shapes, such as recesses provided in surface 21 of guide member 4 or protuberances formed on surface 21 of the guide member 4, to mention a few.

As illustrated in FIGS. 1-3, the openings 30 are circular in configuration and extend completely through guide member 4. Each opening 30 is of sufficient diameter to allow a finger to be placed through it. In the device shown, each opening is extended by an upwardly elongated collar 32 having an inner wall of constant diameter and an outer wall which is tapered from the upper surface 21 of guide member 4 radially inwardly and in a direction toward an outer rim 34 of the collar 32.

The openings 30 are arranged or located on guide member 4 in a manner enabling the guide of the present invention to be used by left-handed or right-handed persons with equal convenience, safety and effectiveness. In addition, the arrangement of openings 30 allows guide 1 to be used with workpieces of various widths. In the guide shown, the openings 30 are arranged in two groups or sets near corresponding ones of the guiding edges 6. The particular group or set is determined by whether the user is left-handed or right-handed and the particular opening 30 within that group or set is selected according to the width of the workpiece to be cut. Thus, a first group of openings 30a, in the present illustration three, is located along the right-hand guiding edge 6 as viewed in FIG. 1. The openings 30a are located relatively close to edge 6, are spaced substantially equally distant from the edge 6, and the centers of the circular openings 30a are spaced substantially equally distant along a line substantially parallel to the right-hand edge 6. Similarly, a second group of openings 30b, in the present illustration three, is located along the left-hand guiding edge 6 as viewed in FIG. 1. The openings 30b are located relatively close to edge 6, are spaced substantially equally distant from the edge 6, and the centers of the circular openings 30b are spaced substantially equally distant along a line substantially parallel to the left-hand edge 6. In addition, the openings 30a,30b of the two groups are in substantial alignment. In particular, lines joining the centers of the corresponding openings 30a, 30b are disposed in substantially mutually parallel relation to the end walls 24,25 of guide member 4. While the illustrated arrangement of two sets of openings 30a,30b is preferred, other arrangements can be employed, such as a single cut-out region in guide member body portion 11 having scalloped-like finger engaging edge formations adjacent each of the guiding edges 6, without departing from the scope of the present invention.

By way of example, in an illustrative device, guide member 4 is about $4\frac{7}{8}$ inches wide between side walls 22,23 and about $9\frac{7}{8}$ inches long between end walls 24,25. Gauge bar 3 is about 15 inches long and $\frac{3}{4}$ inch square. The inner diameter of each opening 30 is about $\frac{7}{8}$ inch, the center of each opening 30 is about 13/16 inch from the outer surface of the corresponding edge 6, and the centers of adjacent openings in the same group or set are about $2\frac{1}{2}$ inches apart in a direction parallel to the corresponding guide edge 6. Other sizes and dimensions can of course be employed.

In operation, the inner surface 12 of guide member body portion 11 is manually placed in contact with and flush against a flat surface 35 of the workpiece 20 such that the gauge bar 3 overhangs an edge 36 of the workpiece 20. The guide member 4 is manually drawn across the flat surface 35 in a direction perpendicular to the edge 36 until the gauge bar 3 is disposed flush against the edge 36. The guide member 4 and gauge bar 3 are then maintained in this position by the hand of the user with at least one finger being placed in an opening 30. In particular, the user manually applies force of sufficient magnitude with at least that finger against the inner wall surface of the opening 30 to maintain the gauge bar 3 flush against the workpiece edge 36 and at the same time either allows his remaining fingers to rest on the surface 35 of the workpiece 20 and the outer surface 21 of the main body portion 11 or applies force with the remainder of his fingers in a direction normal to workpiece surface 35 and outer surface 21 to facilitate maintaining guide member 4 in the desired position relative to workpiece 20 along with placing his thumb on the opposite workpiece edge 36 and applying force in a direction normal to the same. Simultaneously, the guide plate 40 of cutting tool 2 with guide plate edges 42,44 is forced against the guide edge 6 of the guide member 4 with tool guide edge 42 being flush against guide edge 6 as shown in FIG. 1 and the tool 2 makes a cut in the workpiece 20 along a line of cut parallel to the guide edge 6 being utilized.

The distance designated 46 in FIG. 1 between the outer end of gauge bar 3 and the corresponding guide edge 6 being utilized is determined by the distance between the blade 48 of the cutting tool 2 and the tool guide edge 42 of the tool guide plate 40 that is contacting the guide edge 6. This distance is determined initially by running the tool guide plate 40 along the guide edge 6 of the guide member 4 and cutting through the gauge bar 3. Thereafter, when a cut is to be made in a workpiece, the end of the gauge bar 3 is lined up with a designated point on the workpiece 20 where a cut is to be made, and then the tool 2 is guided along the guide edge 6 and through the workpiece 20 until the blade 48 reaches that point resulting in a completed cut. The cut typically will be at a right angle to workpiece edge 36, but it can be at other than a right angle if the gauge bar 3 likewise is attached to the guide member 4 at other than a right angle.

The foregoing description is for the example of a right-handed person holding power tool 2 in his right hand and placing his left hand on guide member 4 and workpiece 20 with his finger in one of the openings 30b. The relative positions of guide 1, tool 2 and workpiece 20 are illustrated in FIG. 1. The guide 1 of the present invention also is usable by a left-handed person who would hold tool 2 in his left hand placing the edge 44 of the guide plate 40 against the left-hand guiding edge 6 as viewed in FIG. 1 and placing his right hand on guide member 4 and workpiece 20 with his finger in one of the openings 30a.

The guide 1 of the present invention advantageously may be manually maintained in a fixed relationship relative to a workpiece in a safe and effective manner and does not slip out of position while it is manually held relative to a workpiece while a cut is being made. The finger engageable formations in the form of openings 30 provide for a firm hand hold and allow less chance of slippage of both the guide 1 and the operator's hand and thus promote avoidance of injury as well as a precise cut. This is enhanced by the depth of openings 30 determined by the height of walls 32. In addition, the peripheral wall portions 22,23,24 also can be gripped if necessary. Pressure applied simultaneously by a finger placed in an opening 30 and a thumb of the same hand placed against edge 37 of workpiece 20 provides an extremely effective, nonslip method of holding guide 1 firmly in place during the entire time that cutting is taking place. Thus, the risk that an operator's hand will slip and cause him injury is greatly reduced.

Another important advantage of the present invention is that it can be utilized, without adjustment, by either a right or left handed individual once the gauge bar 3 has been cut to length on each side of guide member 4. In addition, guide 1 can be used with workpiece of various widths. As shown in FIG. 1 guide member 4 has six openings 30 selectively spaced so that at least one opening can be utilized depending upon the width of the workpiece and whether the cutting tool 2 is being operated by a right handed or left handed individual. It should be recognized that the wider the workpiece, the more difficult it will be to maintain a straight cut without the aid of a guide according to the present invention. As shown in FIGS. 1 and 2, the openings 30 are arranged such that different openings may be utilized in conjunction with varying workpiece widths.

An additional advantage of the present invention as illustrated in FIGS. 1 and 2 is that since gauge bar 3 is maintained in a fixed relationship to guide member 4 by means of fasteners 5, once gauge bar 3 is cut to length, the device of the present invention can be utilized over and over again with the same cutting tool without having to inspect for the possibility that distance 46 has changed and requires an adjustment to compensate for such change. This minimizes the possibility of making a mistake when cutting a workpiece to size.

It is therefore apparent that the present invention accomplishes its intended objects. While an embodiment of the present invention has been described in detail, this is for the purpose of illustration, not limitation.

I claim:

1. In means for guiding a portable power driven cutting tool during operation wherein said guiding means comprises a guide member having a first surface for placement on a workpiece, a second surface exposed during use, a tool guiding edge, and a gauge bar carried by said guide member and extending outwardly beyond said tool guiding edge at a selected angle thereto for use in positioning said guide member on the workpiece in spaced relation to the line of cut, said guide member adapted to be manually maintained in a fixed position relative to the workpiece during operation of the cutting tool, the improvement comprising:
    at least one finger engageable formation in the form of an opening extending through said guide member, each of said finger engageable formations including a circumferential collar projecting upwardly from the second surface, each said collar substantially surrounding an opening to facilitate manually maintaining said guide member in a fixed position relative to the workpiece during operation of the cutting tool.

2. The improved guiding means as set forth in claim 1, wherein each said opening is selectively positioned in said guide member and suitably formed to accommodate the placement of a finger therein, each said opening having a substantially circular configuration and each said collar having a tapered outer wall.

3. The improved guiding means as set forth in claim 1, wherein said guide member has another tool guiding edge disposed substantially parallel to said first-named tool guiding edge, there being at least one finger engageable formation associated with each of said tool guiding edges thereby permitting use by left-handed and right-handed persons.

4. The improved guiding means as set forth in claim 3 including a plurality of finger engageable formations selectively spaced thereon to facilitate manually maintaining said guide member in a fixed position relative to workpieces having various widths, said plurality of finger engageable formations comprising pairs of finger engageable formations, one of the finger engageable formations of each pair positioned adjacent one of the tool guiding edges and the other one of the finger engageable formations of the pair positioned opposite the first named finger engageable formation and adjacent the other one of the tool guiding edges, each of said finger engageable formations of each of the pairs being spaced from and in alignment with the other finger engageable formations located adjacent the same tool guiding edge.

5. In means for guiding a portable power driven cutting tool during operation wherein said guiding means comprises a guide member having a surface for placement on a workpiece, a tool guiding edge, and a gauge bar carried by said guide member and extending outwardly beyond said tool guiding edge at a selected angle thereto for use in positioning said guide member on the workpiece in spaced relation to the line of cut, said guide member adapted to be manually maintained in a fixed position relative to the workpiece during operation of the cutting tool, the improvement comprising:

(a) means for attaching said gauge bar in fixed relationship to said guide member;

(b) a plurality of formations selectively spaced on said guide member, each formation engageable by a finger of either the left or right hand of the user for manually drawing said guide member toward the user and engaging the gauge bar with an edge of the workpiece to facilitate manually maintaining said guide member in a fixed position relative to workpieces having various widths, said plurality of finger engageable formations comprising pairs of finger engageable formations, one of the finger engageable formations of each pair located adjacent one of the tool guiding edges and the other one of the finger engageable formations of the pair located opposite the first named finger engageable formation and adjacent the other one of the tool guiding edges, each of the finger engageable formations of each of the pairs being spaced from and in alignment with the other finger engageable formations located adjacent the same tool guiding edge.

* * * * *